US006917618B2

(12) United States Patent
Thubert et al.

(10) Patent No.: US 6,917,618 B2
(45) Date of Patent: Jul. 12, 2005

(54) ARRANGEMENT IN A ROUTER FOR GENERATING A ROUTE BASED ON A PATTERN OF A RECEIVED PACKET

(75) Inventors: Pascal Thubert, La Colle sur Loup (FR); Marco Molteni, Antibes (FR); Patrick Wetterwald, Cagnes sur Mer (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 10/404,064

(22) Filed: Apr. 2, 2003

(65) Prior Publication Data

US 2004/0196854 A1 Oct. 7, 2004

(51) Int. Cl.[7] .............................................. H04L 12/28
(52) U.S. Cl. .................. 370/395.31; 370/392; 709/238
(58) Field of Search ................................ 370/217, 238, 370/238.1, 252, 349, 351–352, 373, 377, 389, 392, 395.32, 395.52, 395.53, 399, 400, 395.3, 395.31, 393; 455/428, 445; 709/224, 238, 245; 309/226, 230, 238, 239, 245, 250

(56) References Cited

U.S. PATENT DOCUMENTS

| 6,141,738 A | * | 10/2000 | Munter et al. ............... 711/206 |
| 6,675,163 B1 | * | 1/2004 | Bass et al. ....................... 707/6 |
| 2004/0008675 A1 | * | 1/2004 | Basso et al. ................. 370/389 |
| 2004/0032844 A1 | * | 2/2004 | Lewis et al. ................. 370/338 |

OTHER PUBLICATIONS

Hopps, "Analysis of an Equal–Cost Multi–Path Algorithm", Network Working Group, Request for Comments: 2992, Nov., 2000.
Perkins, Ed., "IP Mobility Support", Network Working Group, Request for Comments: 2002, Oct. 1996.
Johnson et al., "Mobility Support in IPv6", Internet Draft, IETF Mobile IP Working Group, draft–ietf–mobileip–ipv6–20.txt, Jan. 20, 2003.
Hinden et al., "IP Version 6 Addressing Architecture", Request for Comments: 1884, Network Working Group, Dec. 1995.

* cited by examiner

Primary Examiner—Wellington Chin
Assistant Examiner—John Shew
(74) Attorney, Agent, or Firm—Leon R. Turkevich

(57) ABSTRACT

A router (e.g., a home agent for an IPv6 mobile router) is configured for determining a destination router (e.g., the IPv6 mobile router) for a received packet based on accessing a routing table having multiple routing entries, each routing entry including a routing key and a routing field that specifies one of a prescribed address specifying the destination router and a computation tag. The computation tag specifies a prescribed function to be executed to calculate a determined address for the destination router (e.g., the home address for the IPv6 mobile router). The router identifies, for each received packet, the matching routing entry based on the corresponding routing key, and in response to detecting the computation tag in the routing field, selectively executes the corresponding function to calculate the determined address for the destination router.

24 Claims, 6 Drawing Sheets

ARRANGEMENT IN A ROUTER FOR GENERATING A ROUTE BASED ON A PATTERN OF A RECEIVED PACKET

BACKGROUND OF THE INVENTION

1. Field of the Invention

The present invention relates to routing of packets by an Internet Protcol (IP) router based on associating a destination address of a received IP packet with routing table entries. More particularly, the present invention relates to aggregation of routes in an IP router for mobile routers of an IPv6 mobile network

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-20.txt (the disclosure of which is incorporated in its entirety herein by reference). According to Johnson et al., the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is at home, packets addressed to its home address are routed to the mobile node's home link, using conventional Internet routing mechanisms.

The mobile node also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

Hence, a mobile node is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

A particular problem of network mobility is that conventional aggregation of routes is not feasable for mobile routers. In particular, routers in a conventional Internet-based network topology are configured for aggregating routes based on groupings of subnets according to a hierarchy of common addresses. For example, a top-level router (e.g., a primary router of an organization configured as an entry point to the organization for all Internet traffic) advertises to other routers in the Internet that all packets having a destination address top level prefix (e.g., 127/8 for IPv4) should be sent to that top-level router.

The top-level router includes a routing table that includes including routing entries. Each routing entry includes a corresponding prefix key and a next hop field. The prefix key is used to match the destination address of an incoming packet (typically applying a net mask to the destination address); hence, the router identifies the entry having the corresponding prefix key that matches the masked destination address, and routes the packet to the router specified in the corresponding next hop field. Hence, a single router may aggregate multiple routes for reaching routers configured for serving the subnets having subnet address prefix values within the aggregated value of 127/8 (e.g., 127.192/10, 127.192/10, 127.192/10, and 127.192/10, etc.). Each subnet typically will include additional routers configured for routing packets within the corresponding prescribed address space.

In the case of mobile networking, however, aggregation is not possible using conventional aggregation techniques, since all the mobile routers are addressed via their own respective home addresses on their own home networks. In particular, the home subnet prefix for a network is an initial set of bits of an IP address which identifies the home link within the Internet topology (i.e. the IP subnet prefix corresponding to the mobile node's home address). However, the home address of a mobile router may be distinct from the subnet prefix of the mobile network attached to the mobile router. Hence, the home agent would require a routing table entry for each mobile router that serves as a point of attachment for a corresponding mobile network.

SUMMARY OF THE INVENTION

There is a need for an arrangement that enables a router to generate a routing table capable of aggregation of routes to mobile routers for respective mobile networks.

There also is a need for an arrangement that enables an Internet Protocol (IP) router to establish a generic representation of multiple routes to reduce routing table size.

There also is a need that enables a router to establish a scalable routing table for routing packets to destination mobile networks, having respective mobile subnet prefixes, via respective mobile routers having home address values that are distinct from the mobile subnet prefixes.

There also is a need for an arrangement that enables a router to execute routing operations based on generating a determined route based on a single generic route expression and supplied parameters.

These and other needs are attained by the present invention, where a router is configured for determining a destination router for a received packet based on accessing a routing table having multiple routing entries, each routing entry including a routing key and a routing field that specifies one of a prescribed address specifying the destination router and a computation tag. The computation tag specifies a prescribed function to be executed to calculate a determined address for the destination router. The router identifies, for each received packet, the matching routing entry based on the corresponding routing key, and in response to detecting the computation tag in the routing field, selectively executes the corresponding function to calculate the determined address for the destination router. Hence, routers can be deployed with routing tables that have computation tags for execution of functions, reducing the necessity for storing prescribed address values for destination routers and enabling pattern-based determination of destination router addresses.

One aspect of the present invention provides a method in an Internet Protocol (IP) based router. The method includes receiving a data packet specifying a destination address, and identifying a matching routing entry from a routing table having multiple routing entries. Each routing entry specifies a corresponding routing key and has a routing field. The method also includes detecting a computation tag in the routing field of the matching routing entry, the computation tag specifying a prescribed function to be executed to calculate a determined address for a destination router. The determined address is calculated based on execution of the prescribed function, in response to detecting the computation tag, and the data packet is output to the determined address.

Another aspect of the present invention provides an Internet Protocol (IP) based router. The router includes an IP interface configured for receiving a data packet specifying a destination address, a routing table, and a routing resource. The routing table has multiple routing entries, each routing entry specifying a corresponding routing key and having a routing field. At least one of the routing fields specifies a computation tag specifying a prescribed function to be executed to calculate a determined address for a destination router. The routing resource is configured for identifying a matching routing entry from the routing table based on the destination address. The routing resource also is configured for executing, in response to detecting the computation tag in the routing field, the corresponding prescribed function to calculate the determined address. The IP interface is configured for outputting the data packet to the determined address.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to a router configured for determining a next-hop address for a next-hop router in routing a received packet, based on calculating the next-hop address according to prescribed functions. The next-hop address for the next-hop router, also referred to as a determined address for a destination router, is calculated based on packet information within the received packet, for example based on the destination address specified in the received packet. Hence, the calculation of a determined address for a destination router enables aggregation of multiple router addresses to a single routing table entry that specifies a prescribed function that describes the aggregation of the multiple router addresses.

Figure 1:
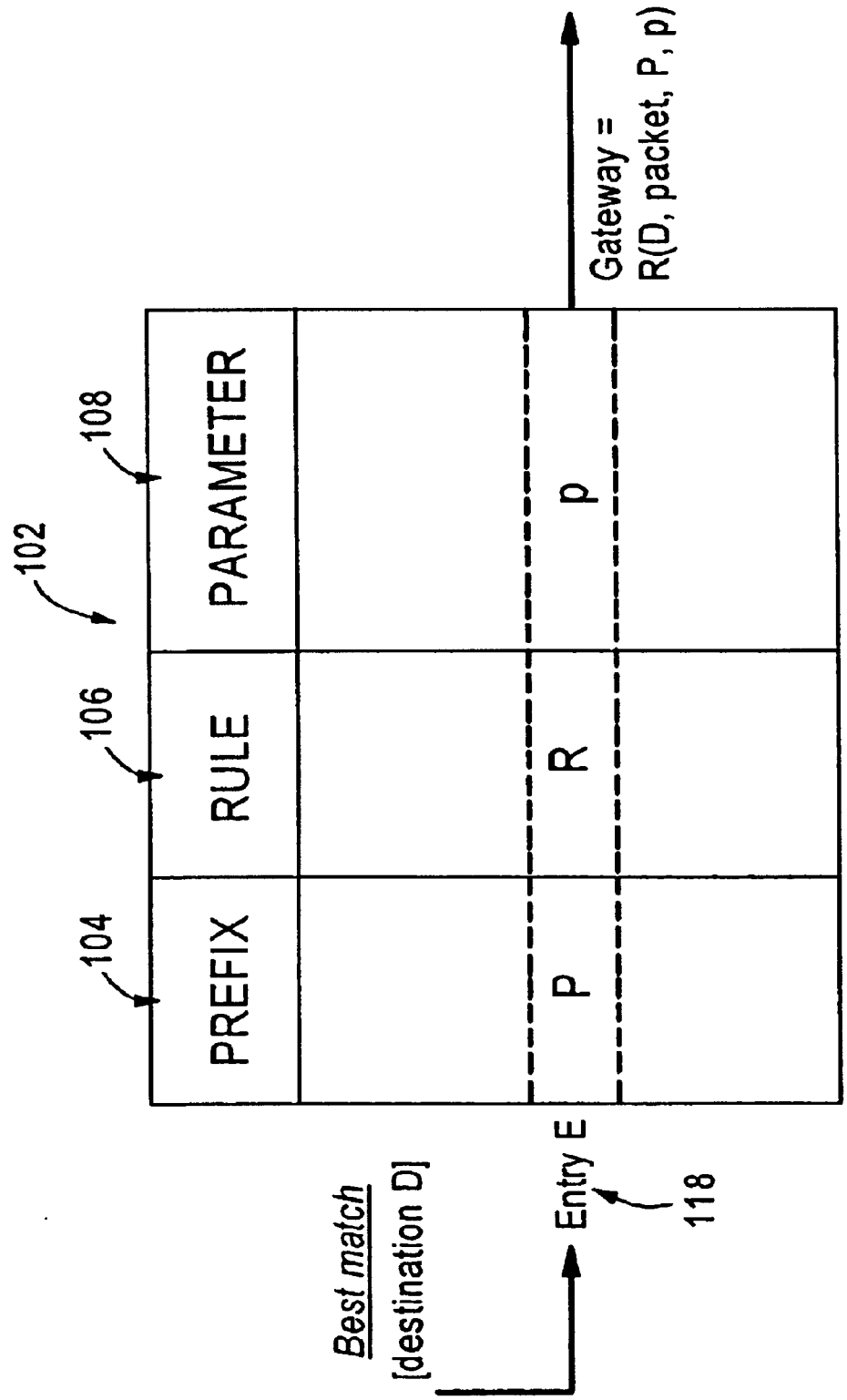
FIG. 1 is a diagram illustrating a routing table configured for generating pattern-based automatic routes, according to an embodiment of the present invention.

FIG. 1 is a diagram illustrating a routing table 102 configured for generating pattern-based automatic routes, according to an embodiment of the present invention. The routing table 102 includes a prefix field 104 that specifies a prefix key P, also referred to as a routing key, a routing field 106 that specifies a rule (e.g., a prescribed function) R, and a parameter field 108 that specifies parameters (p) for execution of the rule R according to the function R(D, packet, P, p). As described below, the next hop gateway address is obtained by execution of the function R(D, packet, P, p).

Figure 2:
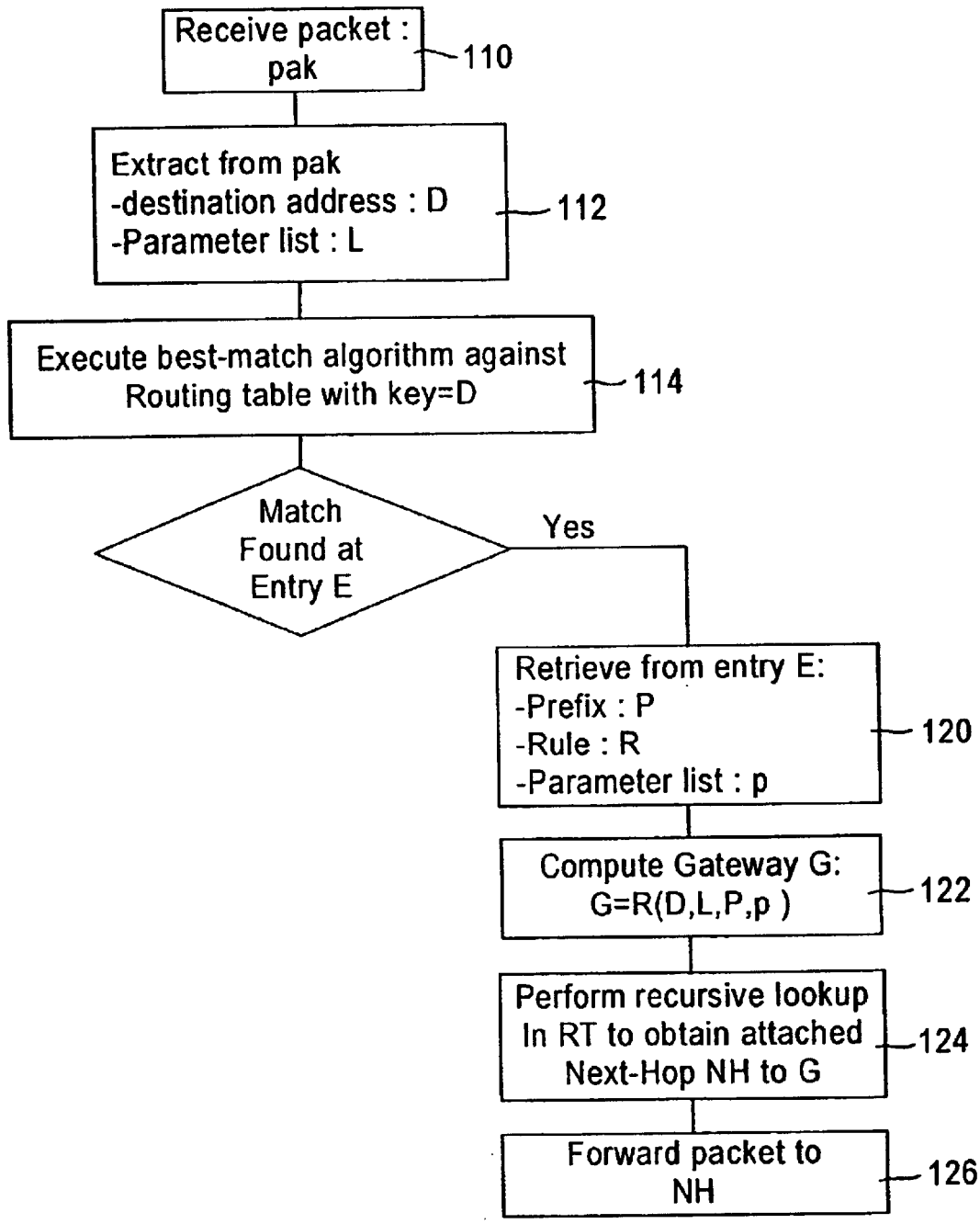
FIG. 2 is a diagram illustrating the method of generating a route based on the route table entry of FIG. 1.

FIG. 2 is a diagram illustrating the method of generating a route based on the route table entry of FIG. 1. In response to receiving a packet in step 110, a router having the routing table 102 extracts in step 112 from the received packet the destination address D, and a prescribed parameter list L (e.g., explicit header values specified in the received packet). The router executes in step 114 a best-match algorithm search against the routing table 102, using the destination address D as a key, in order to locate in step 116 a matching entry (Entry "E") 118.

Assuming the matching entry 118 is located in step 116, the router retrieves in step 120 the corresponding prefix P from the prefix field 104, the corresponding rule R from the routing field 106, and the corresponding parameter list p from the parameters field 108. The router computes in step 122 the gateway address G based on executing the function R based on the destination address D, the parameters P from the received packet, the matching address prefix, P from the prefix field 104, and/or the corresponding stored parameters p from the parameter field 108. If the gateway address is for a gateway that is not connected to the router, the router performs in step 124 a recursive lookup in the routing table 102 (e.g., repeat steps 114 through 122 using the gateway address) to obtain the next hop router to reach the gateway. The packet is then forwarded to the next hop router (NH) in step 126.

Hence, router entries can be simplified based on storing prescribed functions for calculating the destination address.

As described below, the disclosed arrangement for calculating the destination address using a rule specified in the routing table is particularly beneficial for mobile IP.

Figure 3:
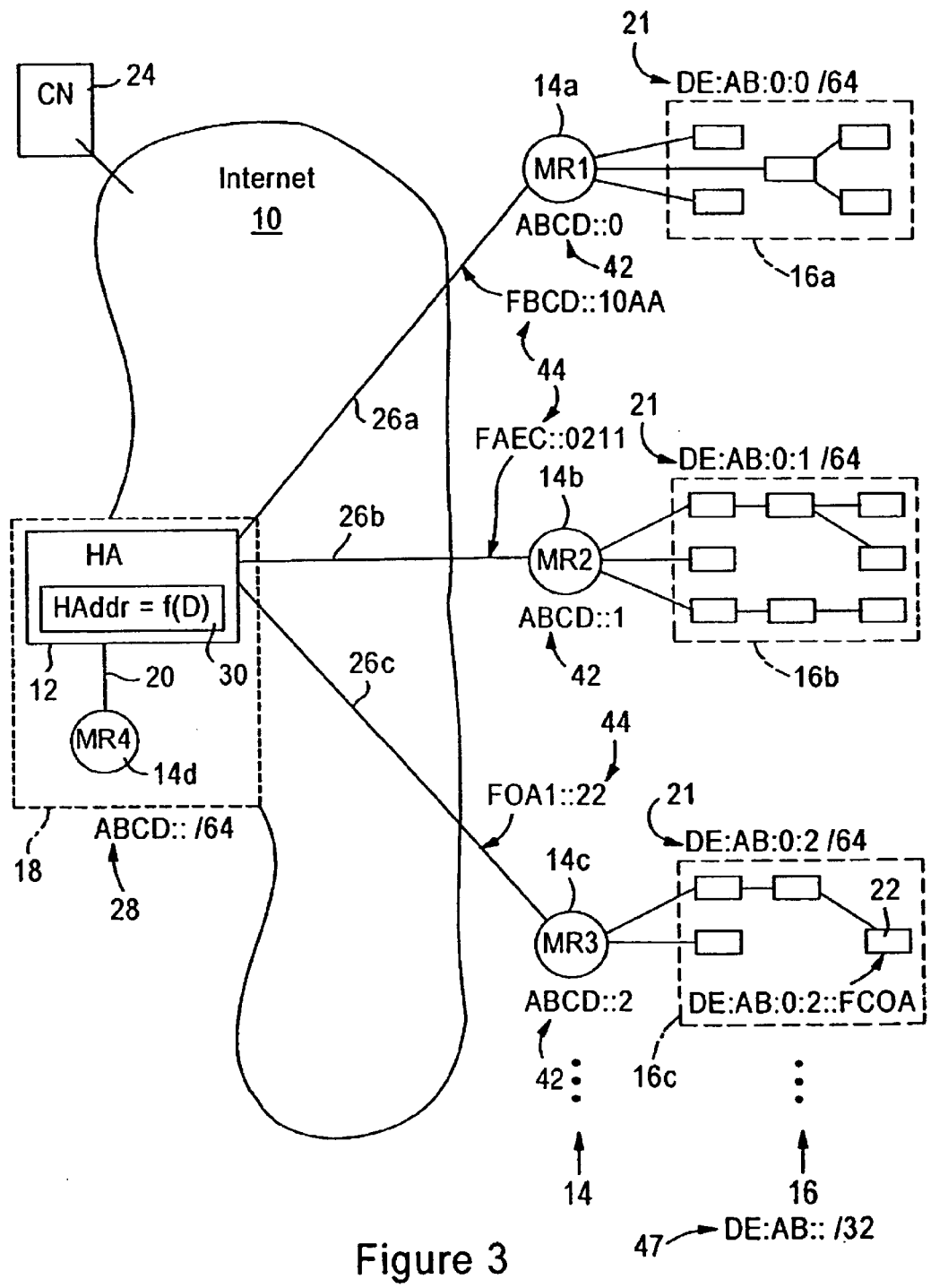
FIG. 3 is a diagram illustrating a wide area network, including a mobile networks having respective mobile routers in communication with a prescribed home agent within, wherein the home agent includes a routing table for pattern-based automatic routes according to an embodiment of the present invention.

FIG. 3 is a diagram illustrating a wide area network 10 having a router 12 configured for calculating a determined address for routing of a received packet to a destination router (e.g., 14a 14b, 14c, etc.), according to an embodiment of the present invention. As illustrated in FIG. 3, the router 12 is implemented as a home agent (HA) and the destination routers 14a, 14b, and 14c are implemented as mobile routers serving as attachment points to the wide area network 10 for respective mobile networks 16a, 16b, and 16c, in accordance with the above-incorporated Internet Draft by Johnson et al. Also note that the mobile router 14d is currently at its home network 18, where the mobile router 14d has a home link 20 within the home network 18 to the home agent 12.

As illustrated in FIG. 3, the home network 18 has an IPv6 home subnet prefix value 28 of "ABCD::/64", using the address notation specified by the IETF Request for Comments (RFC) 1884, incorporated in its entirety herein by reference. In particular, a 128-bit IPv6 address is represented as having eight (8) sixteen bit portions separated by a":" symbol; hence, the 128-bit address value "1080:0:0:0:0:0:0:417A" specifies an address where the first sixteen bits are "1080" (hexadecimal), and the last sixteen bits are "417A". In accordance with RFC 1884, this address value can be truncated to "1080::417A" using a double-colon symbol "::", indicating that all bits between the specified values are all zero's.

As illustrated in FIG. 3, the mobile networks 16a, 16b, and 16c have address prefix values 21 of DE:AB:0:0/64, DE:AB:0:1/64, and DE:AB:0:2/64, respectively. The respective attachment routers 14a, 14b, and 14c providing an attachment point for the mobile networks 16a, 16b, and 16c have home address values 42 of ABCD::0, ABCD::1, and ABCD::2, respectively. Further, the care of addresses 44 for the mobile routers 14a, 14b and 14c are FBCD::10AA, FAEC::0211, and FOA1::22, respectively.

Existing approaches for routing packets between a mobile host 22 and a correspondent node (CN) 24 involve the corresponding mobile router (e.g., 14c) sending the packets via a home agent home agent 12 through a corresponding bidirectional tunnel (e.g., 26c). The home agent 12, upon receiving the packets via the tunnel (e.g., 26c), routes the packet to an Internet router (not shown) identified by existing routing protocols to provide reachability for the correspondent node 24. The correspondent node sends a reply to the mobile host 22 by outputting a packet that specifies in its destination address field the address of the mobile host 22 (e.g., "DE:AB:0:2::FC0A"). The home agent 12 also has sent router advertisement messages to routers in the Internet 10 specifying that the home network 18 (i.e., the network having the home subnet prefix ABCD::/64) is configured for routing packets having the destination network prefix "DE:AB::/32", where the first 32 bits of the 128 bit address equal "DE:AB". Hence, Internet routers will route the packet from the CN 24 and destined for the mobile node 22 to the home agent 12.

However, since the home addresses 42 of the mobile routers (e.g., 14a, 14b, 14c, etc.) cannot be aggregated with the address prefixes 21 of the respective mobile networks 16a, 16b, 16c, conventional approaches would require an individual routing table entry for each corresponding mobile network, where the mobile network address prefix (e.g., "DE:AB :0:2/64") would specify the home address (e.g., "ABCD::2") of the corresponding mobile router (e.g., 14c) as its gateway address. Consequently, conventional routing tables can quickly become overwhelmed by a large number of mobile networks, for example installation of a mobile network in each vehicle manufactured by a vehicle manufacturer, resulting in millions of mobile subnets generated per year.

According to the disclosed embodiment, the home agent 12 includes a routing module 30 configured for calculating a determined address for a destination router, based on executing a prescribed function f(D)specified within a matching routing table entry. As described below, the prescribed function is used to characterize the mapping between the mobile routers 14 and their respective mobile networks 16, enabling the routing information for all the mobile networks 16 to the specified by a single routing entry.

Figure 4:
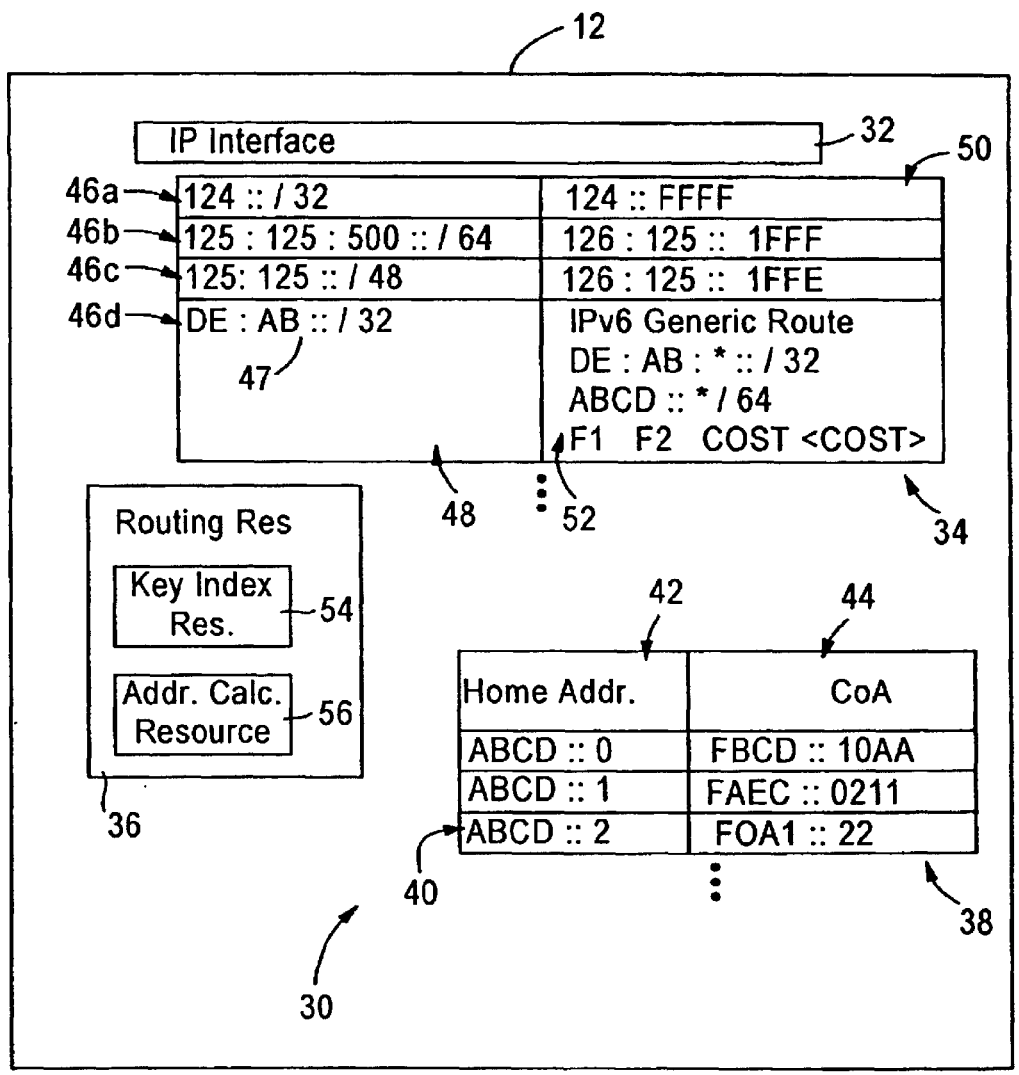
FIG. 4 is a diagram illustrating in detail the home agent of FIG. 3.

FIG. 4 is a diagram illustrating in detail the router 12, according to an embodiment of the present invention. The router 12 includes an Internet protocol interface 32 configured for sending and receiving data packets, and the routing module 30. The routing module 30 includes a routing table 34, and a routing resource 36. In the case where the router 12 is implemented as a home agent for the mobile routers 14, the routing module 30 also includes a binding cache 38 that includes binding cache entries 40 that specify a home address 42 and a care of address 44.

The routing table 34 includes multiple routing entries (e.g., 46a, 46b, 46c, and 46d), each specifying a corresponding routing key 48 and a routing field 50. Each routing key 48 specifies a corresponding IP subnet prefix, depending on existing network topology and aggregation characteristics. For example, the routing keys 48 for the routing entries 46a, 46b, and 46c specify address prefix values "124::/32", "125:125:500::/64", and "125:125::/48" for respective subnets (not shown) having the associated prefix values. As illustrated in FIG. 4, the routing fields 50 for the routing entries 46a, 46b and 46c specify explicit addresses for next-hop routers connected to the router 12.

The routing table 34 also includes a routing entry 46d having a routing key 48 that specifies the address prefix 47 of the aggregated mobile networks 16 (e.g., "DE:AB::/32"); in other words, the mobile networks 16 share the address prefix used as the routing key 46d. The routing entry 46d also includes a routing field 50 that specifies a computation tag 52. The computation tag 52 specifies that at least one function (F) is to be executed in order to calculate with a determined address for the destination router. As illustrated in FIG. 4, the computation tag 52 has the form:

<Address Type> <First Input Variable> <Second Input Variable> <Function Call> <Cost Dec>.

The <Address Type> parameter specifies that the field includes an extended entry, in this case for calculating an IPv6 generic route using the supplied parameters. The input variables ("DE:AB:*::/32" and "ABCD::*/64) specify the variables to be used during execution of the function calls of the specified functions "F1" and "F2", subject to prescribed cost limitations specified in the cost declaration. As illustrated below with respect to FIG. 5, the character "*" represents a variable to be extracted/inserted in the parameter, depending on the specified function. The computation tag 52 it is illustrated solely as an exemplary illustration of specifying parameters and functions within the routing field 50.

As illustrated in FIG. 4, the routing resource 36 includes a key index resource 54 and an address calculation resource 56. The key index resource 54 is configured for identifying a matching routing entry from the routing table 34 for a received IP data packet based on detecting a match between the destination address and the corresponding routing key 48. As described below, the address calculation resource 56 is configured for calculating the address to be used for forwarding the data packet to a destination router; in the case of the router 12 being implemented as a home agent, the address calculation resource 56 is configured for calculating the home address of the mobile router 14 serving the destination host 22.

Figure 5:
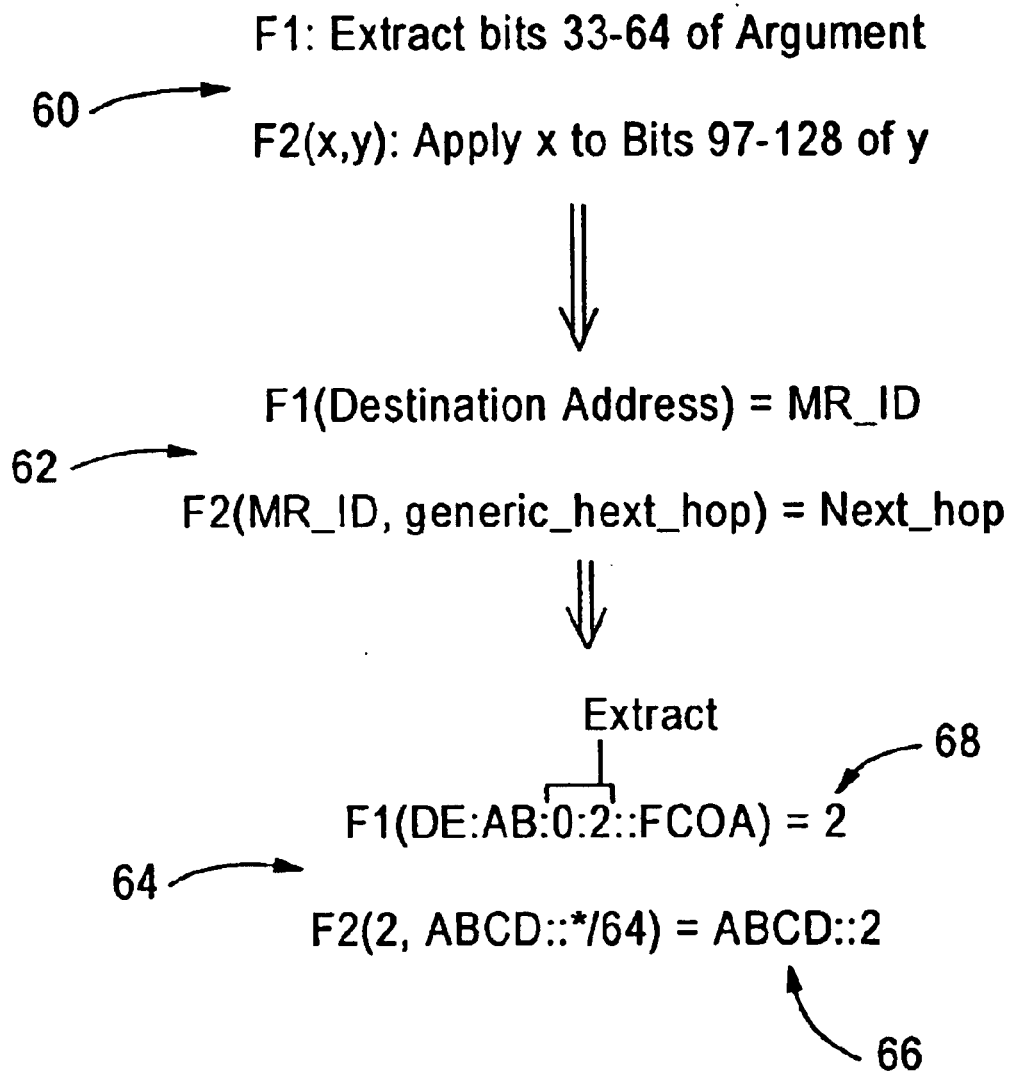
FIG. 5 is a diagram illustrating an exemplary function from the routing field of FIG. 4, used to calculate the home address of the destination mobile router of FIG. 3.

FIG. 5 is a diagram illustrating execution of the functions specified in the routing entry 46d by the address calculation resource 56. In particular, the routing resource 36 issues a function call to the address calculation resource 56 in response to detecting the computation tag 52 in the routing field 50 of the matching routing entry (e.g., 46d). The address calculation resource 56 parses the computation tag 52, and executes the prescribed functions specified in the computation tag 52.

As illustrated in FIG. 5, the address calculation resource 56 includes context definition information 60 within its application runtime environment that defines the functions F1 and F2: as illustrated in FIG. 5, the context definition information 60 specifies that the function F1 extracts prescribed bits of the supplied destination address, in this case the bits 33–64 of the argument; the context definition information 60 also specifies that the function F2 applies the first argument (x) to bits 97–128 of the second argument (y). In the context of mobile computing, the context definition information 60 is applied to provide the functional operations 62, where the function F1 (destination address) is used to determine the mobile router identifier ($MR_{13}$ ID); the mobile router identifier is then used as an argument for the second function F2 (MR_ID, generic_next_hop) to determine the next hop address (e.g., the home address).

Actual execution 64 of the computation tag 52 by the address calculation resource 56 results in the calculated address 66 based on determining the mobile router identifier 68. In particular, the address calculation resource 56 extracts bits 33–64 of the destination address "DE:AB:0:2::FC0A" to obtain the mobile router identifier ("$MR_{13}$ ID=0:2") 68. Note that the bits 33–64 are within the 64-bit address prefix range of the home subnet prefix 28. The address calculation resource 56 then executes the function F2 by replacing the variable "*" of the prescribed address prefix (e.g., the home subnet prefix "ABCD::*/64") 28 with a mobile router identifier 68 ("0:2"), resulting in the determined home address "ABCD::2" 66 of the mobile router 14c serving as the attachment router for the destination host 22.

Figure 6:
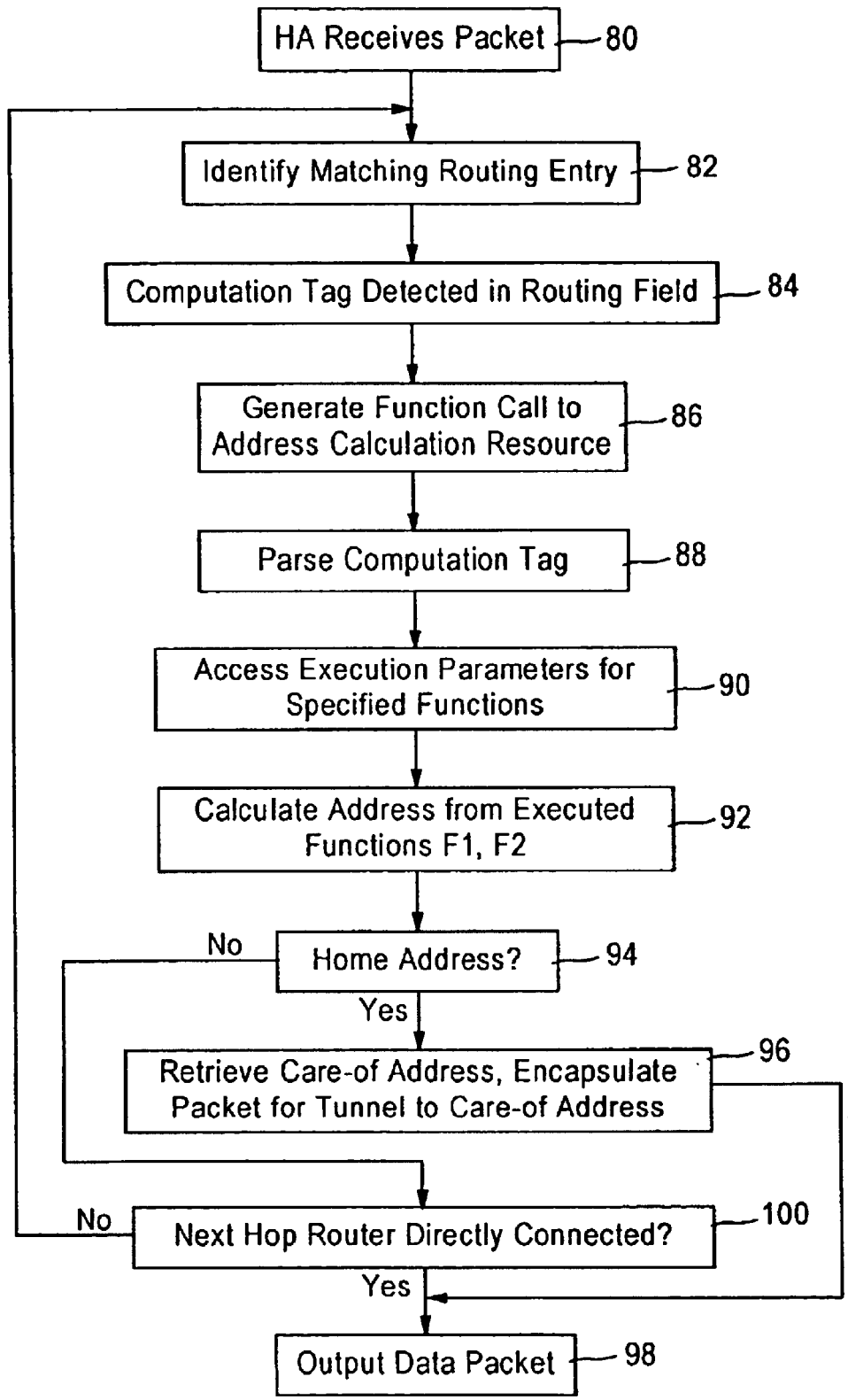
FIG. 6 is a diagram illustrating the method of generating the address for the destination router, according to an embodiment of the present invention.

FIG. 6 is a diagram illustrating the method by the home agent 12 of calculating a home address for routing a received packet, according to an embodiment of the present invention. The steps described in FIGS. 2 and 6 can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins in step 80, where the home agent 12 receives a packet from the correspondent node 24 via the wide area network 10. The key index resource 54 identifies in step 82 a matching routing entry (e.g., 46d) based on the destination address of the received packet (e.g., "DE:AB:0:2::FC0A"). The routing resource 36 detects in step 84 that the corresponding routing field 50 of the matching routing entry 46d specifies a computation tag 52, and in response generates in step 86 a function call to the address calculation resource 56.

The address calculation resource 56 parses the computation tag 52 in step 88, and accesses the relevant parameters from its application runtime environment in step 90, for example the definitions for the functions F1 and F2. The address calculation resource 56 calculates in step 92 the determined address 66 based on execution of the prescribed functions F1 and F2, as illustrated in FIG. 5, and supplies the determined address 66 (e.g., "ABCD::2") to the routing resource 36.

Assuming in step 94 that they determined address 66 specifies a home address for a mobile router 14, the routing resource 36 retrieves in step 96 the corresponding care of address for the mobile router 14c from the binding cache 40, and outputs in step 98 the data packet to the mobile router 14c via its corresponding tunnel 26c.

Assuming in step 94 that the determined address 66 is not for a mobile router, for example in the case where the router 12 is implemented as a generic router, then if in step 100 the determined address does not identify another router directly connected as a next hop to the subject router 12, the routing resource 36 repeats the address lookup, including identifying a matching routing entry, using the determined address as an address key. The repeating of the address lookup is performed in cases where the determined address 66 identifies an intermediate router between the subject router 12 and the destination node, enabling the router 12 to identify the next hop address for forwarding the packet.

According to the disclosed embodiment, addresses for next hop routers are determined based on calculating the determined address according to computation tags within a matching routing entry, enabling a destination router for a packet to be calculated as the packet is received. Hence, routes can be generated by the router based on network topology rules, enabling the effective aggregation of routes in cases where the network topology does not necessarily provide binary aggregation of routes. The disclosed arrangement is particularly beneficial to optimizing routing tables configured for maintaining routes for mobile networks, where conventional aggregation techniques cannot be applied to the mobile routes established by the mobile routers. Further, the disclosed arrangement eliminates the necessity for manual entries in routing tables, reduces the size of routing tables, and simplifies routing processing by minimizing searches through routing tables to identify a matching routing entry.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP) based router, the method comprising:

receiving a data packet specifying a destination address;

identifying, based on the destination address, a matching routing entry from a routing table having multiple routing entries, each routing entry specifying a corresponding routing key and having a routing field;

detecting a computation tag in the routing field of the matching routing entry, the computation tag specifying a prescribed function to be executed to calculate a determined address for a destination router;

calculating the determined address based on execution of the prescribed function, in response to detecting the computation tag; and outputting the data packet to the determined address.

2. The method of claim 1, wherein the calculating includes extracting a prescribed address portion from the destination address, and inserting the prescribed address portion into a prescribed address prefix identifying a group of prescribed routers to form the determined address.

3. The method of claim 2, wherein:
the router is a home agent, and the prescribed routers are mobile routers having respective home addresses and configured for serving as attachment points for respective mobile networks, each of the home addresses having a home subnet prefix of a home link of the home agent;
the prescribed address prefix corresponds to the home subnet prefix;
the prescribed address portion identifies a corresponding one of the mobile routers; and
the determined address corresponds to the home address of the corresponding one mobile router.

4. The method of claim 3, wherein the home subnet prefix corresponds to a first prescribed number of prefix bits, the extracting including extracting the prescribed address portion from within the first prescribed number of prefix bits of the destination address.

5. The method of claim 4, wherein the mobile networks share an address prefix having a second prescribed number of prefix bits less than the first prescribed number, the address prefix corresponding to the routing key of the matching routing entry.

6. The method of claim 1, wherein the outputting includes repeating the identifying step for the determined address based on determining that the determined address is not directly connected as a next hop to the router.

7. An Internet Protocol (IP) based router comprising:
an IP interface configured for receiving a data packet specifying a destination address;
a routing table having multiple routing entries, each routing entry specifying a corresponding routing key and having a routing field, at least one of the routing fields specifying a computation tag specifying a prescribed function to be executed to calculate a determined address for a destination router; and
a routing resource configured for identifying a matching routing entry from the routing table based on the destination address, the routing resource configured for executing, in response to detecting the computation tag in the routing field, the corresponding prescribed function to calculate the determined address, the IP interface configured for outputting the data packet to the determined address.

8. The router of claim 7, wherein the routing resource is configured for calculating the determined address by extracting a prescribed address portion from the destination address, and inserting the prescribed address portion into a prescribed address prefix identifying a group of prescribed routers to form the determined address.

9. The router of claim 8, wherein:
the router is a home agent, and the prescribed routers are mobile routers having respective home addresses and configured for serving as attachment points for respective mobile networks, each of the home addresses having a home subnet prefix of a home link of the home agent;
the prescribed address prefix corresponds to the home subnet prefix;
the prescribed address portion identifies a corresponding one of the mobile routers; and
the determined address corresponds to the home address of the corresponding one mobile router.

10. The router of claim 9, wherein the home subnet prefix corresponds to a first prescribed number of prefix bits, the routing resource configured for extracting the prescribed address portion from within the first prescribed number of prefix bits of the destination address.

11. The router of claim 10, wherein the mobile networks share an address prefix having a second prescribed number of prefix bits less than the first prescribed number, the address prefix corresponding to the routing key of the matching routing entry.

12. The router of claim 7, wherein the routing resource is configured for repeating the identification of a second matching routing entry for the determined address based on determining that the determined address is not directly connected as a next hop to the router.

13. A computer readable medium having stored thereon sequences of instructions for routing packets by an Internet Protocol (IP) based router, the sequences of instructions including instructions for:
receiving a data packet specifying a destination address;
identifying, based on the destination address, a matching routing entry from a routing table having multiple routing entries, each routing entry specifying a corresponding routing key and having a routing field; detecting a computation tag in the routing field of the matching routing entry, the computation tag specifying a prescribed function to be executed to calculate a determined address for a destination router;
calculating the determined address based on execution of the prescribed function, in response to detecting the computation tag; and
outputting the data packet to the determined address.

14. The medium of claim 13, wherein the calculating includes extracting a prescribed address portion from the destination address, and inserting the prescribed address portion into a prescribed address prefix identifying a group of prescribed routers to form the determined address.

15. The medium of claim 14, wherein:
the router is a home agent, and the prescribed routers are mobile routers having respective home addresses and configured for serving as attachment points for respective mobile networks, each of the home addresses having a home subnet prefix of a home link of the home agent;
the prescribed address prefix corresponds to the home subnet prefix;
the prescribed address portion identifies a corresponding one of the mobile routers; and
the determined address corresponds to the home address of the corresponding one mobile router.

16. The medium of claim 15, wherein the home subnet prefix corresponds to a first prescribed number of prefix bits, the extracting including extracting the prescribed address portion from within the first prescribed number of prefix bits of the destination address.

17. The medium of claim 16, wherein the mobile networks share an address prefix having a second prescribed number of prefix bits less than the first prescribed number, the address prefix corresponding to the routing key of the matching routing entry.

18. The medium of claim 13, wherein the outputting includes repeating the identifying for the determined address based on determining that the determined address is not directly connected as a next hop to the router.

19. An Internet Protocol (IP) based router comprising:
   means for receiving a data packet specifying a destination address; and
   means for identifying, based on the destination address, a matching routing entry from a routing table having multiple routing entries, each routing entry specifying a corresponding routing key and having a routing field,
   the means for identifying configured for detecting a computation tag in the routing field of the matching routing entry, the computation tag specifying a prescribed function to be executed to calculate a determined address for a destination router;
   the means for identifying configured for calculating the determined address based on execution of the prescribed function, in response to detecting the computation tag;
   the means for receiving configured for outputting the data packet to the determined address.

20. The router of claim 19, wherein the means for identifying is configured for extracting a prescribed address portion from the destination address, and inserting the prescribed address portion into a prescribed address prefix identifying a group of prescribed routers to form the determined address.

21. The router of claim 20, wherein:
   the router is a home agent, and the prescribed routers are mobile routers having respective home addresses and configured for serving as attachment points for respective mobile networks, each of the home addresses having a home subnet prefix of a home link of the home agent;
   the prescribed address prefix corresponds to the home subnet prefix;
   the prescribed address portion identifies a corresponding one of the mobile routers; and
   the determined address corresponds to the home address of the corresponding one mobile router.

22. The router of claim 21, wherein the home subnet prefix corresponds to a first prescribed number of prefix bits, the means for identifying configured for extracting the prescribed address portion from within the first prescribed number of prefix bits of the destination address.

23. The router of claim 22, wherein the mobile networks share an address prefix having a second prescribed number of prefix bits less than the first prescribed number, the address prefix corresponding to the routing key of the matching routing entry.

24. The router of claim 19, wherein the means for identifying is configured for repeating identification of a corresponding matching routing entry for the determined address based on determining that the determined address is not directly connected as a next hop to the router.

* * * * *